(12) United States Patent
Hartland (10) Patent No.: US 8,986,636 B2
(45) Date of Patent: Mar. 24, 2015

(54) APPARATUS AND METHOD FOR FILTERING ENGINE EXHAUST GASES

(71) Applicant: Jaguar Land Rover Limited, Warwickshire (GB)

(72) Inventor: Jonathan Hartland, Coventry (GB)

(73) Assignee: Jaguar Land Rover Limited, Whitley, Coventry (GB)

( * ) Notice: Subject to any disclaimer, the term of this patent is extended or adjusted under 35 U.S.C. 154(b) by 0 days.

(21) Appl. No.: 14/348,112

(22) PCT Filed: Oct. 1, 2012

(86) PCT No.: PCT/EP2012/069315
§ 371 (c)(1),
(2) Date: Mar. 28, 2014

(87) PCT Pub. No.: WO2013/045687
PCT Pub. Date: Apr. 4, 2013

(65) Prior Publication Data
US 2014/0234188 A1 Aug. 21, 2014

(30) Foreign Application Priority Data
Sep. 29, 2011 (GB) .................................. 1116772.3

(51) Int. Cl.
*B01D 46/00* (2006.01)
*B01D 53/56* (2006.01)
(Continued)

(52) U.S. Cl.
CPC ........ *B01D 53/9431* (2013.01); *B01D 53/9477* (2013.01); *B01D 2255/1021* (2013.01); *B01D 2255/1023* (2013.01); *B01D 2255/20723* (2013.01); *B01D 2255/20738* (2013.01); *B01D 2255/20761* (2013.01); *B01D 2255/9155* (2013.01); *B01D 2255/9205* (2013.01); *B01D 2258/012* (2013.01); *F01N 3/035* (2013.01); *F01N 3/2066* (2013.01); *F01N 2250/02* (2013.01); *Y02T 10/24* (2013.01); *B01D 46/42* (2013.01); *B01D 2279/30* (2013.01); *F01N 13/0093* (2013.01)
USPC .................. 423/213.2; 423/213.7; 423/215.5; 60/274; 60/297; 60/301; 60/311

(58) Field of Classification Search
USPC ........... 423/213.2, 213.7, 215.5; 60/274, 297, 60/301, 311
See application file for complete search history.

(56) References Cited

U.S. PATENT DOCUMENTS 8,001,769 B2 * 8/2011 Wei et al. .......................... 60/286
2010/0175372 A1 7/2010 Lambert et al.
(Continued)

FOREIGN PATENT DOCUMENTS

DE 10 2012 205 350 A1 * 10/2013 .............. F01N 3/021
EP 1985352 A2 10/2008

OTHER PUBLICATIONS

International Search Report for International Application No. PCT/EP2012/069315 mailed Jan. 30, 2013.

*Primary Examiner* — Timothy Vanoy
(74) *Attorney, Agent, or Firm* — Carlson, Gaskey & Olds (57) ABSTRACT

Embodiments of the invention provide an engine aftertreatment apparatus comprising first and second diesel particulate filters (DPFs), the first DPF being provided upstream of the second DPF, the second DPF being provided with a coating of a second DPF catalyst, the second DPF catalyst being arranged to promote reduction of NOx.

19 Claims, 4 Drawing Sheets (51) Int. Cl.
*B01D 53/94* (2006.01)
*F01N 3/021* (2006.01)
*F01N 3/035* (2006.01)
*F01N 3/20* (2006.01)
*B01D 46/42* (2006.01)
*F01N 13/00* (2010.01)

(56) References Cited

U.S. PATENT DOCUMENTS

2010/0300078 A1 12/2010 Lu et al.
2012/0014843 A1* 1/2012 Birkby et al. ................. 422/180
2014/0150408 A1* 6/2014 Van Niekerk et al. .......... 60/274
2014/0161671 A1* 6/2014 Cuellar et al. ................ 422/115

* cited by examiner

APPARATUS AND METHOD FOR FILTERING ENGINE EXHAUST GASES

FIELD OF THE INVENTION

The present invention relates to an apparatus and a method for filtering exhaust gas generated by a diesel engine. Aspects of the invention relate to an apparatus, to a vehicle and to a method.

BACKGROUND

Engine exhaust gases contain a number of gases and particulates that it is undesirable to release to the atmosphere. The gases typically include hydrocarbons, carbon monoxide (CO), carbon dioxide ($CO_2$) and nitrogen oxides (NOx) whilst the particulates include carbon particles and other solid and liquid phase components.

Figure 1:
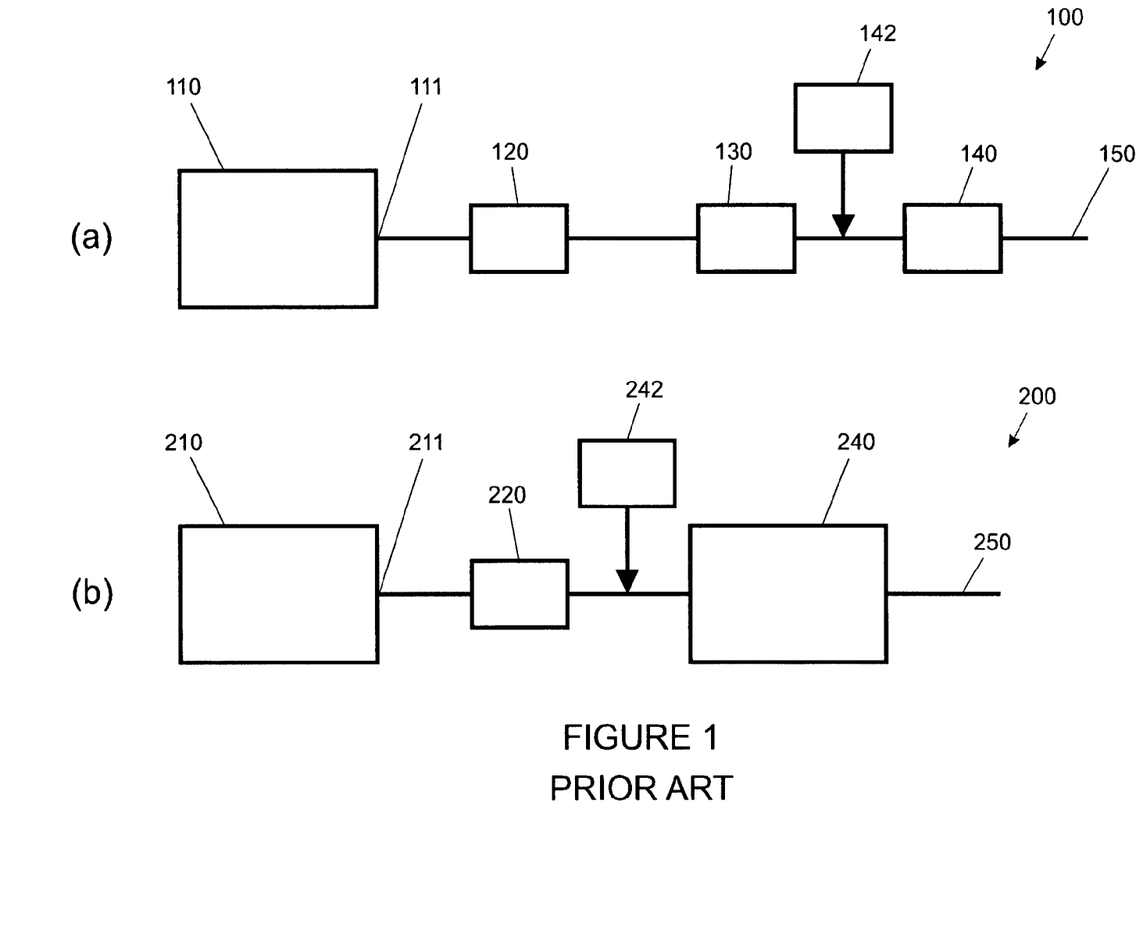
FIG. 1 is a schematic illustration of a known aftertreatment apparatus.

It is known to provide engine aftertreatment apparatus employing a diesel oxidation catalyst (DOC) module, a diesel particulate filter (DPF) module and a selective catalytic reduction (SCR) catalyst module. FIG. 1(a) shows an example of such an apparatus 100.

The apparatus 100 has a DOC module 120 coupled to an exhaust outlet 111 of an engine 110. The DOC module 120 is provided upstream of a DPF module 130 which is in turn provided upstream of an SCR module 140. An ammonia source 142 is arranged to inject ammonia gas or an ammonia precursor compound into a flowstream of exhaust gases from the DPF module 130 to the SCR module 140. In some systems, the order of the SCR catalyst and DPF can be reversed.

The DOC module 120 is arranged to oxidise hydrocarbons and CO to form $CO_2$ and $H_2O$. Some $NO_2$ may also be formed by oxidation of NO in the exhaust gas stream. The generation of $NO_2$ by the DOC 120 can be helpful in promoting formation of $N_2$ in the SCR module, and in oxidising particulate matter trapped on the DPF. The DOC module 120 may comprise a ceramic monolith having an oxidation catalyst provided thereover. The catalyst may be applied by means of a wash coat, and may comprise one or more types of metal such as platinum, rhodium, palladium or an alloy of two or more metals.

The DPF module 130 is a wall-flow filter module and contains a porous DPF filter material arranged to trap soot particles entrained in the exhaust gases. The filter material is coated with an oxidation catalyst that oxidises the trapped particles to form $CO_2$. DPF modules 130 are typically arranged to operate in a passive regeneration role in which oxidation of the trapped particles takes place to a sufficient extent without a requirement to provide external heat energy to the DPF module 130 other than that provided by the exhaust gases as exhausted from the engine 110 at the exhaust outlet 111.

Figure 2A:
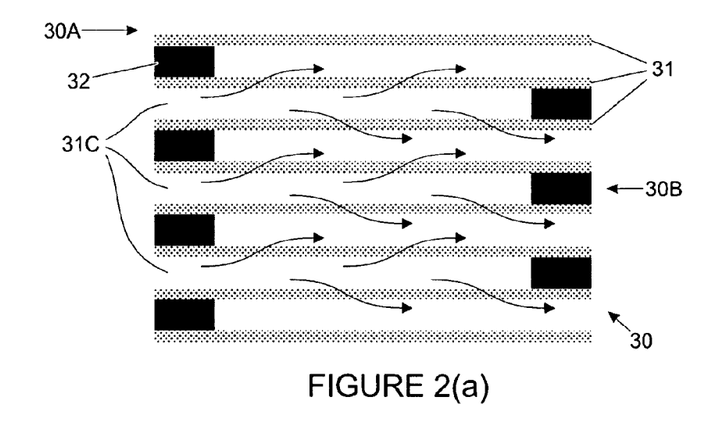

FIG. 2(a) is a cross-sectional schematic illustration of a wall-flow filter 30 in which exhaust gases flow through parallel channels 31C defined by walls 31 of the filter 30. The channels 31C are blocked alternately at a first end 30A or a second end 30B such that gases entering the filter 30 through one channel 31C at the first end 30A are forced to flow through a wall 31 of the filter 30 in order to exit the filter through an adjacent channel 31C at the second end 30B.

Figure 2B:
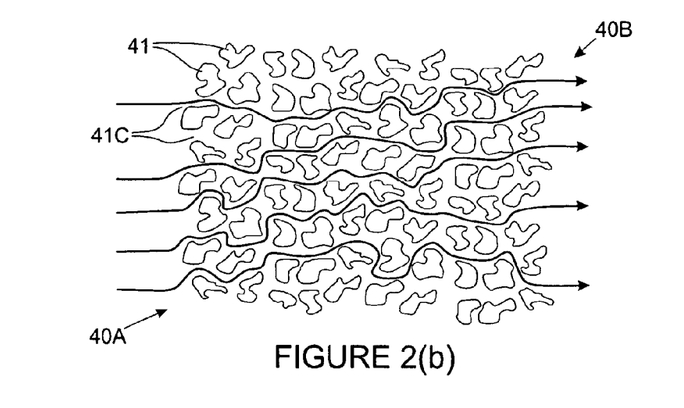

FIG. 2(b) is a cross-sectional schematic illustration of a filter 40 of flow-through or deep bed type. The filter has a porous matrix 41 having a plurality of pores or channels 41C therethrough. Gases entering the filter 40 at a first end 40A may pass through the filter 40 by passing along the channels 41C and emerge from a second end 40B opposite the first end 40A.

The problem exists that the amount of soot trapped in the DPF module 130 may become too high, for example due to the DPF module 130 not attaining a sufficiently high temperature for a sufficiently long period during a given drivecycle. An active regeneration operation may therefore be required. A number of technologies exist for performing active regeneration operations. One common technology is an operation in which the engine is operated under conditions in which additional fuel is injected into the cylinder late in the engine operating cycle. Excess unburned fuel becomes entrained in the exhaust gas and enters the DOC module 120. The DOC module 120 oxidises the unburned fuel generating heat which causes an increase in the temperature of catalyst and soot in the DPF module 130, promoting oxidation of soot particles trapped in the DPF module 130.

It is to be understood that it is undesirable to operate the engine 110 under active regeneration conditions for at least the following reasons: (1) the process causes an increase in fuel consumption and $CO_2$ and NOx emissions; and (2) some of the fuel mixes with engine oil causing a reduction in viscosity and lubricity of the oil.

Thus it is desirable to keep a flow path of exhaust gases from the engine 110 to the DOC module 120 and DPF module 130 as short as possible, so that active regenerations may be performed in as short a time period as possible and passive regeneration can be maximised.

The SCR module 140 is arranged to reduce $NO_x$ gases passing therethrough to $N_2$. A reduction catalyst such as Cu, Fe, V or a mixture thereof is provided in the SCR module 140 and ammonia ($NH_3$) is injected into the flow of exhaust gases into the SCR module 140, either directly or as an ammonia precursor, in order to effect reduction of the $NO_x$ gases.

Exhaust gases flowing through the SCR module 140 are exhausted from the apparatus 100 by means of an exhaust outlet 150 downstream of the SCR module 140.

In some known arrangements, the total volume and weight of catalyst in the aftertreatment apparatus is reduced by combining the DPF and SCR modules in a single wall-flow filter. This is achieved by coating a DPF filter material with SCR catalyst (a reducing catalyst) rather than the usual DPF catalyst (an oxidising catalyst) to form a so-called SCR coated DPF (or SCRDPF) module.

FIG. 1(b) shows an example of an apparatus 200 having such an arrangement. Like features of the arrangement of FIG. 1(b) to that of FIG. 1(a) are provided with like reference numerals prefixed numeral 2 instead of numeral 1.

A conventional DOC module 220 is provided immediately downstream of an exhaust gas outlet 211 of an engine 210. An SCR coated DPF (SCRDPF) module 240 is provided downstream of the DOC module 220. An ammonia source 242 is arranged to inject ammonia gas or an ammonia precursor compound into a flowstream of exhaust gases from the DOC module 220 to the SCRDPF module 240. Exhaust gases flowing through the SCRDPF module 240 are exhausted from the apparatus 200 by means of an exhaust outlet 250 downstream of the module 240.

Because the DPF of the module 240 is coated with SCR catalyst and not the normal oxidation catalyst, the only way to oxidise trapped soot particles is by operating the SCRDPF module 240 at a higher temperature than would otherwise be desirable. However, operation of the module 240 at a higher temperature has the disadvantage that the $NH_3$ that is provided in order to promote reduction of NO and $NO_2$ to $N_2$ in the presence of the SCR catalyst becomes oxidised and pre-stored NH₃ is released and therefore does not reduce NO and NO₂ to N₂.

A further disadvantage of the SCRDPF module 240 is that it requires a relatively large package size and may need to be mounted underneath the vehicle. This results in an increase in a length of the flowpath of exhaust gases from the engine 210, and therefore a greater drop in temperature of the gases by the time they reach the module 240. Consequently active regeneration of the SCRDPF module 240 is required to be performed regularly in order to oxidise the soot particles trapped by it.

In addition to the disadvantage stated above that SCRDPF filters require frequent active regeneration events, such filters also suffer the disadvantage that they may provide an increased backpressure on exhaust gases flowing through the aftertreatment apparatus. This reduces an efficiency of the engine.

It is desirable to provide an improved engine aftertreatment apparatus that does not suffer the disadvantages of known SCRDPF modules 240.

STATEMENT OF THE INVENTION

In one aspect of the invention there is provided an engine aftertreatment apparatus comprising first and second diesel particulate filter (DPF) modules, the first DPF being provided upstream of the second DPF, the second DPF comprising a second DPF catalyst, the second DPF catalyst being arranged to promote reduction of one or more nitrogen oxides.

This has the advantage that the first DPF may be arranged to trap particles entrained in engine exhaust gases passing through the apparatus thereby reducing a particle loading on the second DPF. The first DPF may therefore perform a pre-filter function, acting as an exhaust gas pre-filter for the second DPF. The first DPF may also be made of reduced size compared with known SCR coated DPFs thereby enabling the first DPF to be mounted closer to the engine. The first DPF may therefore be exposed to exhaust gases of a higher temperature, allowing oxidisation of particulate matter and a reduction in the number of active regeneration events required. Furthermore, because the particle loading on the second DPF is reduced compared with known SCR coated DPF systems, the number of active regeneration events required by the second DPF filter may be reduced. In some embodiments of the invention the requirement to perform active regeneration of one or both of the first and second DPFs may be eliminated.

Advantageously the first DPF may be arranged to trap particles having a size in a first size range from a first DPF lower particle size value to a first DPF upper particle size value and to allow particles having a size above the first DPF upper particle size value to flow therethrough.

The first DPF lower particle size value may be in the range of from around 1 nm to around 10 nm.

The first DPF lower particle size value may be around 1 nm or around 10 nm.

Optionally the first DPF upper particle size value is one selected from amongst around 100 nm and around 200 nm.

The first DPF may be more effective at trapping smaller particles of up to 100 nm in size. In some embodiments the first DPF is arranged to trap particles in the size range from around 1 nm to around 100 nm. In some embodiments the first DPF is arranged to trap particles in the size range from around 10 nm to around 100 nm.

Optionally the first DPF is arranged to cause agglomeration of particles having a size in the first size range.

Advantageously the first DPF may comprise a filter of flow-through or deep bed type.

Advantageously the second DPF may be arranged to trap particles having a size range from a second DPF lower particle size value to a second DPF higher particle size value.

Further advantageously the second DPF lower particle size value may be higher than the first DPF lower particle size value.

This feature has the advantage that a backpressure created by the second DPF may be made lower than the backpressure created by a known SCRDPF device. This is because the second DPF has a higher particle size trapping threshold than known SCRDPF devices.

Optionally the second DPF lower particle size is less than the first DPF upper particle size.

The second DPF may be arranged to trap particles over substantially the whole particle size spectrum.

The second DPF may be arranged to trap particles in the range from around 10 nm to around 100 microns, optionally from around 100 nm to around 100 microns.

Advantageously the second DPF may be of the wall-flow type.

Further advantageously the first DPF may be pr with a coating of a first DPF catalyst arranged to oxidise carbon particles trapped by the first DPF.

Advantageously the first DPF catalyst may comprise a platinum and/or palladium catalyst. The catalyst may be supported by a metallic foam, metal fleece or corrugated foil. Other supports are also useful.

Further advantageously the second DPF catalyst may comprise a selective catalytic reduction (SCR) catalyst.

Optionally the second DPF catalyst may comprise one selected from amongst Cu, Fe and V.

Advantageously the first DPF may be provided in a first DPF module and the second DPF may be provided in a second DPF module different from the first DPF module.

This feature has the advantage that the first DPF may be packaged in the form of a relatively small module (compared with known SCRDPF modules 240) and therefore be provided at a location having a shorter flowpath from an exhaust gas outlet of the engine.

Optionally the first DPF may be provided within or in the vicinity of an exhaust manifold.

In a further aspect of the invention there is provided a method of treatment of engine exhaust gases comprising: passing the exhaust gases through a first diesel particulate filter (DPF); and subsequently passing the exhaust gases through a second DPF downstream of the first DPF, the second DPF comprising a second DPF catalyst, the second DPF catalyst being arranged to promote reduction of one or more nitrogen oxides.

In a still further aspect of the invention there is provided an engine aftertreatment system comprising: a first diesel particulate filter (DPF) of flow-through or deep bed type arranged to cause agglomeration and trapping of smaller particles; and a second DPF downstream of the first, the second DPF also being of the wall-flow type and arranged to trap larger particles than the first DPF, the second DPF being provided with a coating of a second DPF catalyst, the second DPF catalyst being arranged to reduce one or more nitrogen oxides.

Advantageously the second DPF may be arranged to and trap larger particles than the first DPF and not the smaller particles.

This feature has the advantage that the second DPF may be formed to exert a reduced backpressure on engine exhaust gases passing therethrough.

Within the scope of this application it is expressly envisaged that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

BRIEF DESCRIPTION OF THE DRAWINGS

Embodiments of the invention will now be described, by way of example only, with reference to the accompanying figures in which:

FIG. 2 is a schematic illustration of filters of (a) wall-flow type and (b) flow-through or deep bed type;

DETAILED DESCRIPTION

Figure 3:
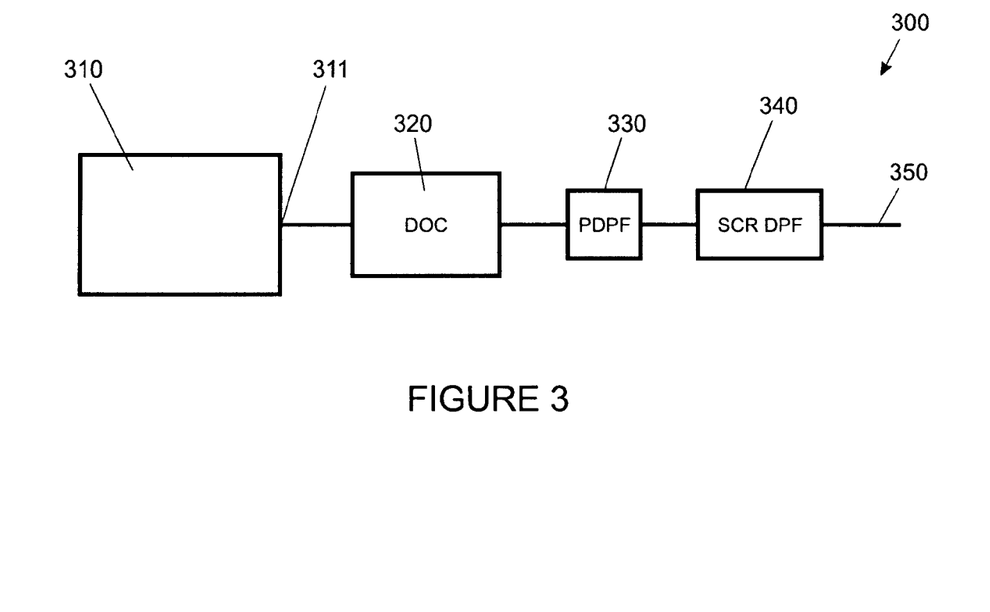
FIG. 3 is a schematic illustration of an aftertreatment apparatus according to an embodiment of the present invention.

FIG. 3 is a schematic illustration of an engine aftertreatment apparatus 300 according to an embodiment of the present invention. The apparatus 300 has a diesel oxidation catalyst (DOC) module 320 coupled to an exhaust gas outlet 311 of an engine 310. The DOC module 320 is coupled upstream of a partial diesel particulate filter (PDPF) module 330 which is in turn provided upstream of a selective catalytic reduction diesel particulate filter (SCRDPF) module 340 in which the DPF is coated with SCR catalyst.

The PDPF module 330 is of the flow-through or deep bed type whilst the DPF module 340 is of the wall-flow type. It is to be understood that the PDPF module 330 is a partial filter module because it is arranged to allow certain particles entrained in engine exhaust gases to pass directly through it whilst other entrained particles are trapped by it. The PDPF module 330 is arranged to trap particles having a size below a prescribed size range whilst particles having a size above this range are allowed to pass therethrough. In some embodiments the PDPF module 330 is arranged to trap particles having a size below around 200 nm. In some embodiments the PDPF module 330 is arranged to trap particles having a size in the range from around 1 nm to around 100 nm, from 1 nm to around 200 nm, from around 10 nm to around 100 nm or from 10 nm to around 200 nm. Other size ranges may also be useful.

The deployment of a particle filter module 330 upstream of the SCRDPF module 340 has the advantage that a particle loading on the module 340 may be reduced as described in more detail below. This in turn has the advantage that a backpressure on exhaust gases due to the module 340 may be reduced, enabling an increase in efficiency of operation of the apparatus 300.

The PDPF module 330 is arranged to trap particulates by deep bed filtration mechanisms such as inertial deposition, flow line interception or diffusional deposition. Electrophoresis or thermophoresis phenomena may also play a part in trapping particulates. As such the PDPF module 330 is arranged to trap particles of relatively small size as described above. Thus particles of relatively large size typically pass through the PDPF module 330 without becoming trapped. In some embodiments a width of pores or channels through the PDPF module 300 is from around 0.5 mm (millimetres) to around 5 mm, optionally around 1 to 3 mm. In some embodiments the pores or channels have a breadth that is of a similar size. In some embodiments the pores or channels have a breadth that is larger than the width, i.e. the pores or channels are elongate in cross-section. In other words, the pores or channels may have two orthogonal dimensions normal to a flowpath of gas that are of sizes that are substantially the same or which are different to one another.

The three filtration mechanisms noted above are illustrated schematically in FIG. 4, in which particles P are trapped at a wall W of a filter.

Figure 4:
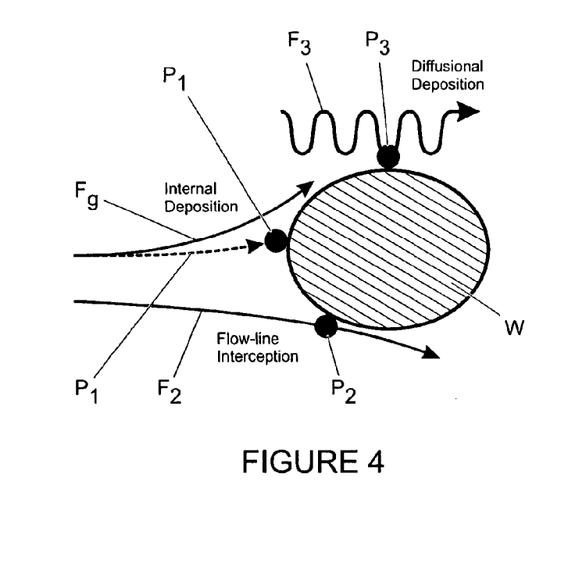
FIG. 4 is a schematic illustration of three particulate filtration trapping mechanisms.

Trapping by inertial deposition is a trapping mechanism in which an entrained particle P1 'collides' directly with a wall W of a filter because it is unable to follow directly a flowpath Fg of gases through pores or channels of the filter due to inertia. Its actual flowpath F1 therefore results in a direct collision with the wall W.

Trapping by flowline interception is a mechanism in which a flowpath F2 of gases in which a particle P2 is entrained brings the particle into contact with the wall W, trapping the particle P2.

Trapping by diffusional deposition is a mechanism in which a flowpath F3 of a particle P3 entrained in gas flow causes the particle P3 to become trapped at the wall W by diffusion of the particle P3 to the wall W.

Figure 5:
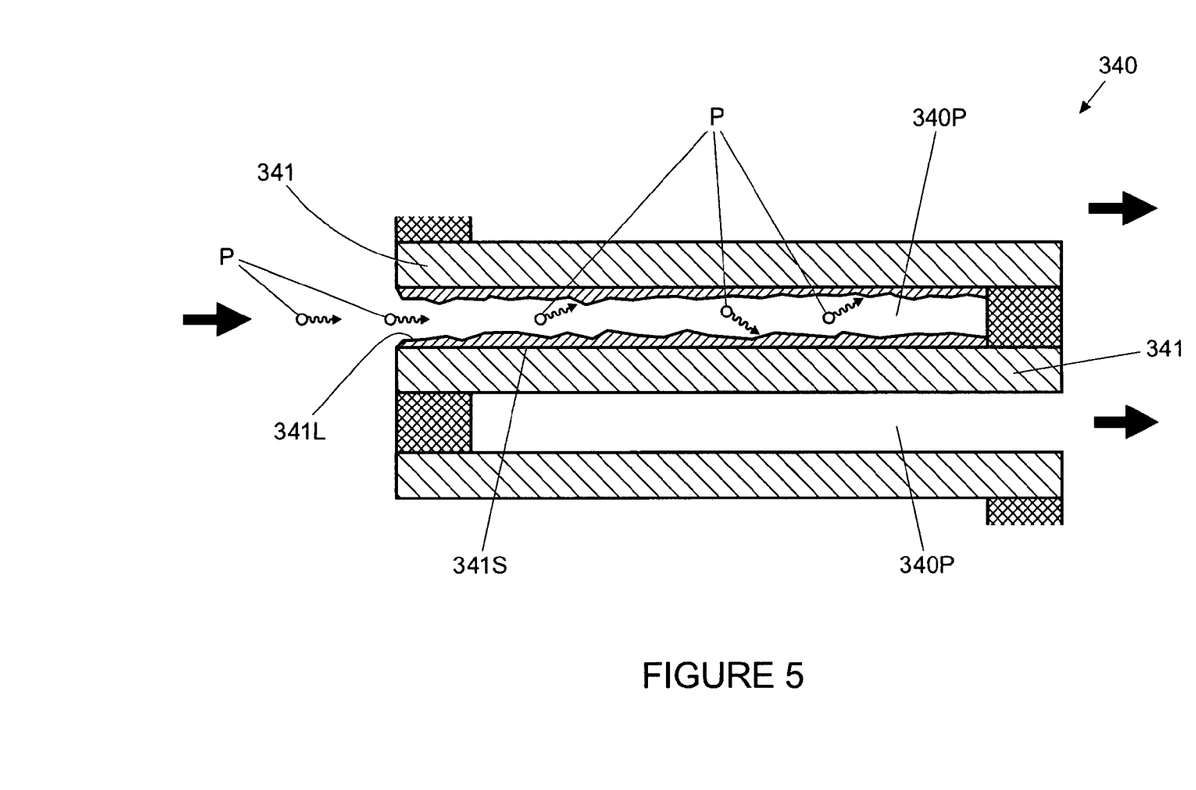
FIG. 5 is a schematic cross-sectional illustration of a filter module in use.

FIG. 5 is a schematic cross-sectional illustration of the SCRDPF module 340 in use. The DPF module 340 contains a particulate filter material 341 (FIG. 5) of wall-flow type that is coated with a selective catalytic reduction (SCR) catalyst and may be referred to as an SCR coated DPF or SCRDPF module 340. In some embodiments the filter material 341 has a channel density of around 300 channels per square inch. In some arrangements, walls defining the channels have a thickness of around 0.3 mm. In some arrangements a size of the channels or pores in the filter 341 is in the size range from around 1 micron (μm) to around 50 microns, optionally from around 10 microns to around 50 microns.

The filter material 431 defines an array of substantially parallel gas flow passageways 340P, adjacent passageways being blocked at opposite respective ends with respect to a direction of flow of fluid through the module 340. Thus gas flowing into the module is forced to flow through one of the alternate passageways, through the portion of the filter material 341 separating adjacent passageways and out from the module 340 via a passageway adjacent the one through which it entered the module 340. Thus the gas is forced to flow through a wall of filer material 341 separating adjacent passageways 340P.

The SCRDPF module 340 is arranged initially to filter particles P by one or more of the deep bed filtration mechanisms described above.

However, as the amount of particles P trapped by the filter material 341 increases, the filter material 341 becomes clogged and a layer 341L of particles builds up at an inlet surface 341S of the filter material 341 being a surface through which gases pass into the material 341. As the layer 341L increase in thickness the module 340 begins to filter by a sieve filtration (or cake filtration) mechanism.

It is to be understood that during the early stages of particle loading of a fresh or newly regenerated SCRDPF module 340, before the cake filtration mechanism has begun to operate, an efficiency of the module 340 may be lower, especially for smaller particles. Advantageously, the additional filtration provided by the DPF module 330 reduces the number of particulates that pass through the apparatus 300 during this period.

Furthermore, it is found that the PDPF module 330 may be made smaller than a conventional SCRDPF module 240 (and of a size more comparable to a conventional DPF module 130) due to the presence of the PDPF module 330 upstream of the SCRDPF module 340 without compromising performance relative to prior art aftertreatment apparatus. The smaller size of the PDPF module 330 allows the module 330 to be provided closer to the engine exhaust outlet 311, allowing agglomerates of particles trapped in the module 330 to be oxidised in the module 330 without a requirement for active regeneration operations to be performed.

It is to be understood that in some embodiments the filter material of the PDPF module 330 is coated with an oxidation catalyst to promote oxidation of particles trapped within the PDPF module 330 in a similar manner to known DPF modules 130.

As noted above the PDPF module 330 has a bed filter (FIG. 2(*a*)) such as a metal foam, metal fleece or perforated foil. In contrast, the SCR coated DPF module 340 is formed of a high porosity wall flow ceramic filter, as shown schematically in FIG. 2(*b*).

As noted above, embodiments of the invention have the advantage that because a PDPF module 330 is employed upstream of the SCRDPF module 340, a particle loading on the SCRDPF module 340 may be reduced. The PDPF module 330 may be made sufficiently small that it may be located sufficiently close to the engine 310 that active regeneration events may not be required to be performed in order to oxidise particles trapped by the module 330.

Furthermore, the PDPF module 330 may be arranged to trap smaller particles allowing the SCRDPF module 340 to be formed to have a reduced backpressure on a flow of exhaust gases therethrough.

In some embodiments, because the SCRDPF module 340 has a reduced particle loading relative to SCR coated DPF devices provided in known aftertreatment systems, a time period between regenerations (if required) may be increased. This has the advantage of reducing an amount by which engine oils are diluted by diesel fuel and an amount of undesirable emissions emitted by the aftertreatment apparatus 300.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus comprising first and second diesel particulate filter (DPF) modules, the first DPF being provided upstream of the second DPF, the second DPF comprising a DPF catalyst arranged to promote reduction of one or more nitrogen oxides, wherein the first DPF comprises a filter of flow-through or deep bed type.

2. An apparatus as claimed in claim 1, wherein the first DPF is arranged to trap particles having a size in a first size range from a first DPF lower particle size value to a first DPF upper particle size value and to allow particles having a size above the first DPF upper particle size value to flow therethrough.

3. An apparatus as claimed in claim 2, wherein the first DPF lower particle size value is at least one of around 1 nm and around 10 nm.

4. An apparatus as claimed in claim 2, wherein the first DPF upper particle size value is one selected from amongst around 100 nm and around 200 nm.

5. An apparatus as claimed in claim 2, wherein the first DPF is arranged to cause agglomeration of particles having a size in the first size range.

6. An apparatus as claimed in claim 2, wherein the second DPF is arranged to trap particles having a size range from a second DPF lower particle size value to a second DPF higher particle size value.

7. An apparatus as claimed in claim 6, wherein the second DPF lower particle size value is higher than the first DPF lower particle size value.

8. An apparatus as claimed in claim 6, wherein the second DPF lower particle size is less than the first DPF upper particle size.

9. An apparatus as claimed in claim 1, wherein the second DPF is arranged to trap particles over substantially the whole particle size spectrum.

10. An apparatus as claimed in claim 1, wherein the second DPF is arranged to trap particles in a range that is at least one of from around 10 nm to around 100 microns and from around 100 nm to around 100 microns.

11. An apparatus as claimed in claim 1, wherein the second DPF is of the wall-flow type.

12. An apparatus as claimed in claim 1, wherein the first DPF is provided with a coating of a DPF catalyst arranged to oxidise carbon particles trapped by the first DPF.

13. An apparatus as claimed in claim 12, wherein the DPF catalyst of the first DPF comprises at least one of platinum and palladium.

14. An apparatus as claimed in claim 1, wherein the DPF catalyst of the second DPF comprises a selective catalytic reduction (SCR) catalyst.

15. An apparatus as claimed in claim 14, wherein the DPF catalyst of the second DPF comprises at least one of Cu, Fe and V.

16. An apparatus as claimed in claim 1, wherein the first DPF is provided in a first DPF module and the second DPF is provided in a second DPF module different from the first DPF module.

17. An apparatus as claimed in claim 1, wherein the first DPF is provided within or in the vicinity of an exhaust manifold.

18. A method of treatment of engine exhaust gases comprising:
  passing the exhaust gases through a first diesel particulate filter (DPF); and
  subsequently passing the exhaust gases through a second DPF downstream of the first DPF;
  the second DPF comprising a DPF catalyst arranged to promote reduction of NOx.

19. A vehicle comprising:
  a first diesel particulate filter (DPF), wherein the first DPF comprises at least one of a flow-through filter and a deep bed type filter; and a second DPF downstream of the first DPF, wherein the second DPF comprises a DPF catalyst arranged to promote reduction of a nitrogen oxide.

\* \* \* \* \*